(12) United States Patent
Partridge

(10) Patent No.: US 6,515,458 B1
(45) Date of Patent: Feb. 4, 2003

(54) PULSE OSCILLATOR AND VOLTAGE LEVEL CONVERTER

(75) Inventor: Leslie Partridge, Davis, CA (US)

(73) Assignee: Ion Systems, Inc., Berkeley, CA (US)

( * ) Notice: Subject to any disclaimer, the term of this patent is extended or adjusted under 35 U.S.C. 154(b) by 0 days.

(21) Appl. No.: 09/844,580

(22) Filed: Apr. 26, 2001

(51) Int. Cl.[7] ................................. G05F 1/12
(52) U.S. Cl. ........................................ 323/247
(58) Field of Search ............................. 323/234, 247, 323/265, 328, 349

(56) References Cited

U.S. PATENT DOCUMENTS 3,641,463 A * 2/1972 Perks
4,864,636 A * 9/1989 Brunius

* cited by examiner

Primary Examiner—Adolf Deneke Berhane
(74) Attorney, Agent, or Firm—Fenwick & West LLP

(57) ABSTRACT

A signal translating circuit is operable on applied input signal through recurring cycles of conduction and non-conduction of a junction type transistor in response to current transfers between inductors in collector and base circuits through an internal conduction path of the collector-base junction. The inductor in the collector circuit is connected to receive the input signal, and bias circuitry connected between the base and emitter receives the input signal for powering cyclic operation at a frequency determined in part by the values of inductance in the base and collector circuits. Output utilization circuitry produces output voltages of opposite polarity from oscillator output pulses of predominantly one polarity.

20 Claims, 4 Drawing Sheets

| Test # | Vin | Iin mA | Q [15] [9] | 23 | 25 mFd | 27 uH | 29 uH | Pulse Output, Width, rep. rate [17] [35] | | | |
|---|---|---|---|---|---|---|---|---|---|---|---|
| | | | | | | | | Eo Max | Eo Min | w ns | R kHz |
| 1 | 0.5 | 0.04 | ZTX855 | 20k | 0.1 | 10 | 210 | 1.9 | 0.08 | 348 | 777 |
| 2 | 1.5 | 0.47 | ZTX855 | 20k | 0.1 | 10 | 210 | 9.3 | -0.6 | 257 | 644 |
| 3 | 3 | 0.96 | ZTX855 | 20k | 0.1 | 10 | 210 | 22.3 | -0.7 | 229 | 641 |
| 4 | 5 | 1.68 | ZTX855 | 20k | 0.1 | 10 | 210 | 38.5 | -1.3 | 210 | 645 |
| 5 | 10 | 3.38 | ZTX855 | 20k | 0.1 | 10 | 210 | 81.7 | -1.8 | 192 | 655 |
| 6 | 24 | 7.38 | ZTX855 | 20k | 0.1 | 10 | 210 | 200 | -6.6 | 188 | 650 |
| 7 | 10 | 6.5 | PN2222 | 4700 | 0.1 | 100 | 210 | 98 | -11.1 | 160 | 725 |
| 8 | 10 | 18.8 | ZTX855 | 4700 | 0.1 | 100 | 210 | 248 | -13 | 180 | 212 |
| 9 | 10 | 8.3 | ZTX855 | 4700 | 0.1 | 100 | 210 | 135 | -6 | 187 | 404 |
| 10 | 10 | 3.39 | ZTX855 | 20k | 0.1 | 100 | 210 | 82 | -4.7 | 194 | 652 |
| 11 | 10 | 1.28 | ZTX855 | 100k | 0.1 | 100 | 210 | 52.9 | -1.3 | 206 | 953 |
| 12 | 10 | 1.4 | ZTX855 | 100k | 1 | 10 | 210 | 48 | -1.8 | 227 | 924 |
| 13 | 10 | 1.24 | ZTX855 | 100k | 0.005 | 10 | 210 | 48.8 | -1.5 | 226 | 918 |
| 15 | 10 | 3.3 | PN2222 | 4700 | 0.1 | 10 | 210 | 56.8 | -3.8 | 157 | 1177 |
| 16 | 10 | 3.3 | PN2222 | 4700 | 0.1 | 33 | 210 | 63.3 | -5 | 153 | 1105 |
| 17 | 10 | 3.74 | PN2222 | 4700 | 0.1 | 74 | 210 | 70 | -6.2 | 151 | 1020 |
| 18 | 10 | 0.89 | 2N2222 | 20k | 0.1 | 1000 | 33500 | 81.7 | -2.9 | 2700 | 45.2 |
| 19 | 10* | 0.614 | PN2222 | 20k | 0.1 | 100 | 4800 | 41 | -0.6 | 1180 | 243 |
| 20 | 10 | 0.72 | 2N2222 | 20k | 0.1 | 74 | 1000 | 40.8 | -2.5 | 377 | 684 |
| 21 | 10 | 0.96 | 2N2222 | 20k | 0.1 | 10 | 210 | 37.2 | -1.6 | 169 | 1681 |
| 22 | 10 | 4.46 | PN2222 | 4700 | 0.1 | 10 | 74 | 57.6 | -5.6 | 100 | 1950 |
| 23 | 10 | 3.3 | PN2222 | 4700 | 0.1 | 10 | 210 | 56.5 | -3.4 | 165 | 1158 |
| 24 | 10 | 5.3 | PN2222 | 4700 | 0.1 | 10 | 1000 | 52.8 | -6.5 | 129 | 1717 |

10*: Setup Used for Waveform Images

FIG. 4

PULSE OSCILLATOR AND VOLTAGE LEVEL CONVERTER

FIELD OF THE INVENTION

This invention relates to converters and more particularly to an oscillator circuit for operation as a converter of low DC input voltage to higher cyclic output voltages suitable of rectification or other loading circuits.

BACKGROUND OF THE INVENTION

Traditional oscillator circuits known by such common names as Colpitts or Hartley, or the like, conventionally rely upon a gain element such as a vacuum tube or transistor and some external feedback scheme such as magnetically-coupled coils in input and output circuits to sustain oscillatory operation. Such circuits may oscillate at varying frequencies determined in part by tuned circuits to produce output signals at selected frequencies.

SUMMARY OF THE INVENTION

In accordance with the present invention, an oscillator circuit operates without specific tuning circuits using a gain element that provides internal coupling of current pulses between inductors in the input and output circuits, and avoids external coupling between such inductors. Current transfers through a collector-base junction of an NPN (or PNP) bipolar tranistor sustains oscillation to produce a level of output signal that is determined in part by the sizes of inductors used, and by loading in an output circuit connected across the gain element.

BRIEF DESCRIPTION OF THE DRAWINGS

FIG. 4 is a table of parameters for alternative embodiment of the present invention.

DETAILED DESCRIPTION OF THE INVENTION

Figure 1:
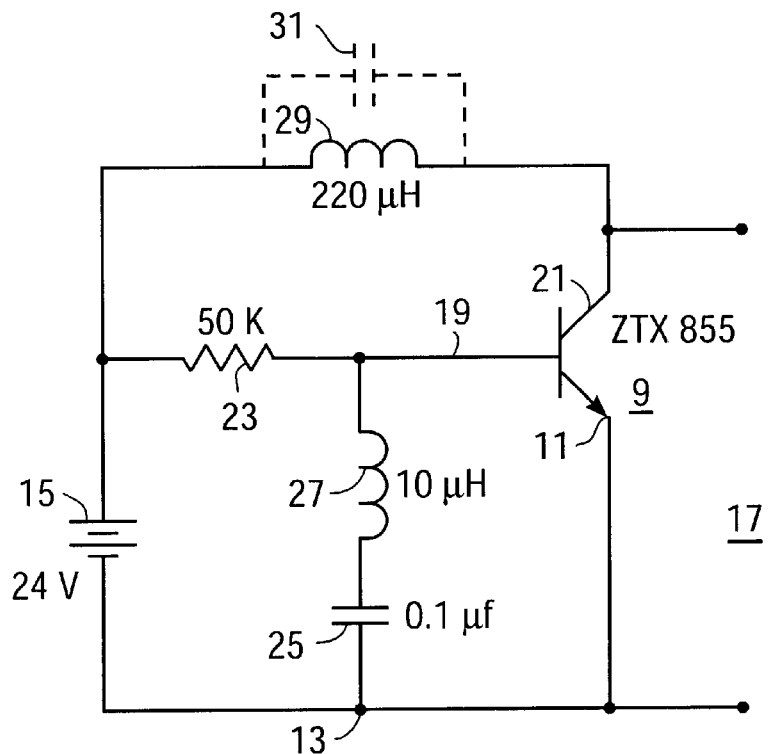
FIG. 1 is a schematic diagram illustrating one embodiment of the present invention.

Referring now to FIG. 1, there is shown one embodiment of the invention including a junction-type transistor 9 of NPN conductivity type having an emitter electrode 11 connected to one terminal 13 that is common to input 15 and output 17, and having a base electrode 19 and a collector electrode 21. Voltage applied to the input 15 is supplied to the base electrode 19 through resistor 23, and the base-emitter junction is shunted by the series connection of bypass capacitor 25 and inductor 27. Voltage applied to the input 15 is also applied to the collector 21 through inductor 29 which preferably has greater inductance then the inductor 27. For proper operation, the inductors 27, 29 should be magnetically isolated to avoid feedback coupling therebetween, and may be magnetically shielded or at least separated and oriented at mutually right angles.

In operation, input voltage 15 initially applied to the circuit causes the voltage on the base to rise to a level of about 0.5 volts and supplies base current through resistor 23, and oscillations begin in response to noise, supply fluctuations, or other random perturbations. The bypass capacitor 25 presents low impedance for variations in current, and also accumulates an average charge per operating cycle that establishes a self-biasing voltage level. During conduction of base current, the collector-emitter path of transistor 9 is conductive and current also flows through inductor 29.

During oscillations, as the transistor turns on and then off, current initially flowing in the collector through inductor 29 establishes a flyback pulse. Pulse width is determined by the values of inductance 29 and its shunt capacitance. Pulse height is determined additionally by input voltage and the duration of previous current conduction. At the end of the pulse portion of the oscillation cycle, the collector voltage swings negative, thus pulling current of similar amplitude out of inductor 27 through the base-collector junction. This quickly charges inductor 27 with energy that slowly dissipates by forcing current into the base, turning the transistors on again. Inductor 27 can be smaller than inductor 29 since its time constant is extended by the heavy loading resistance of the base-emitter junction. If too large, the collector flyback voltage may become too high, resulting in base-emitter breakdown voltage, and possibly zener breakdown in the base-emitter junction, as the collector voltage swings negative. The base current thus supplied by the inductor 27 diminishes to a level that is insufficient to sustain conduction of the transistor 9. The transistor 9 thus turns off, initiating dissipation of energy stored in the inductor 29 and another resultant transfer of current between inductors 29 and 27 through the collector-base junction of transistor 9, in the manner as previously described. It is desirable to use a relatively fast NPN (or PNP) transistor 9 with medium to high current conduction capacity as the active switching device in the circuit. Low collector-base capacitance and low stray capacitance are preferred for stable operation.

The cyclic recurrence of this operation occurs at a frequency determined predominantly by the values of the inductors 27, 29 and less significantly by the level of applied input voltage 15. For the circuit parameters as illustrated, operating frequency is approximately 800 KHz on nominal input voltage 15. Peak output voltage appearing across the collector-emitter circuit of transistor 9 is determined by the level of applied input voltage 15, the limits of transistor breakdown voltage, the internal capacitance 31 of inductor 29, and the level of base current attained during conduction of transistor 9. Additionally, this peak output voltage is reduced by load connected to the collector 21. The bypass capacitor 25 accumulates charge over operating cycles that establishes a self-biasing voltage thereacross typically approaching a level of about 0.6 volts.

Figure 3:
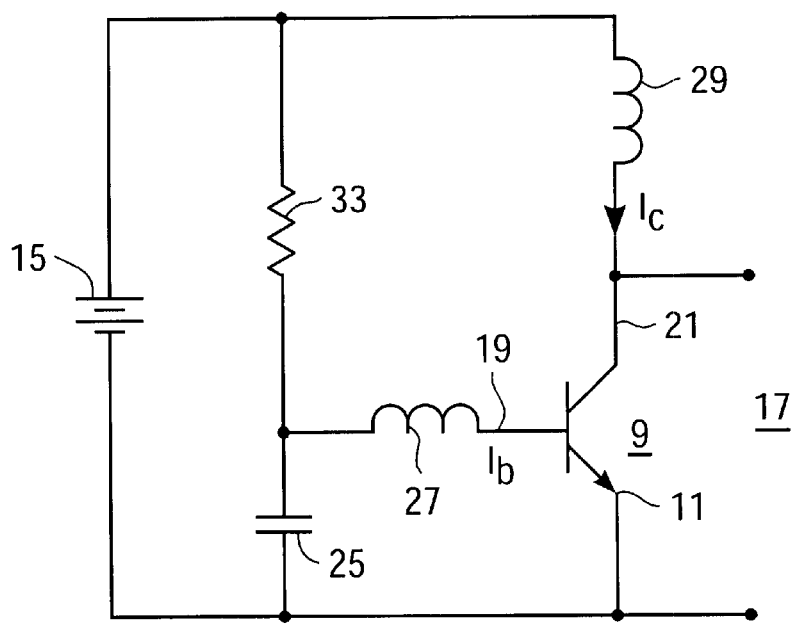
FIG. 3 is a schematic diagram illustrating another embodiment of the present invention.

Referring now to FIG. 3, there is shown a schematic diagram of another embodiment of the present invention in which a resistor 33 supplies bias current to the common junction of the inductor 27 and capacitor 25 that are serially connected across the base-emitter junction of the transistor 9. In this embodiment, oscillation of the circuit produced substantially in the manner previously described.

Figure 2A:
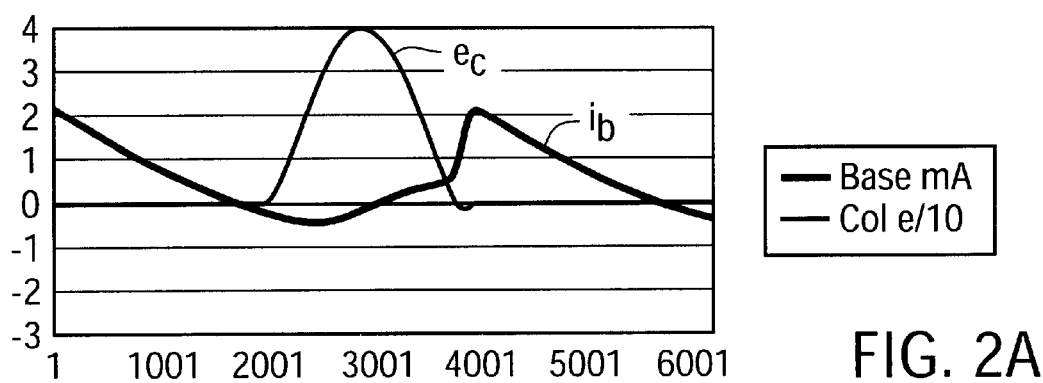
FIGS. 2A–D are charts illustrating operating wave forms in the embodiment of the invention.
Figure 2B:
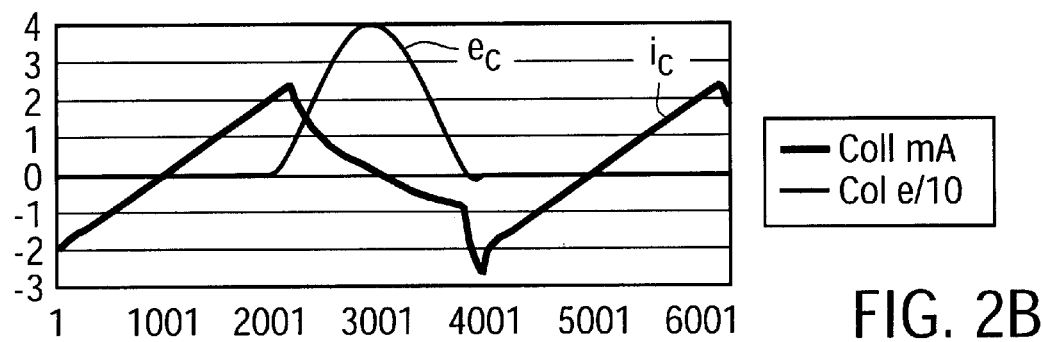
Figure 2C:
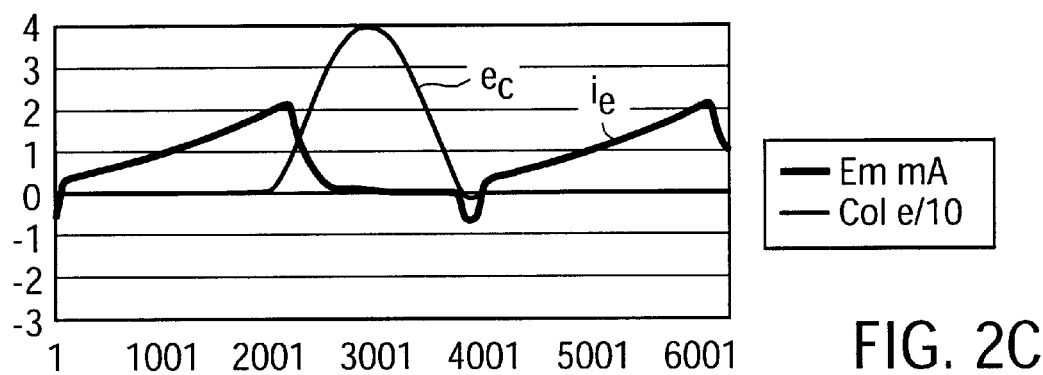
Figure 2D:
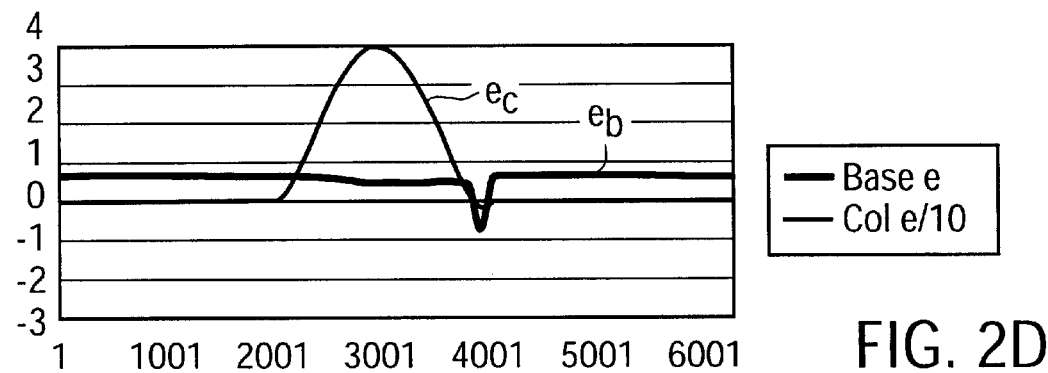

Referring now to the graphs of FIGS. 2A–D, there are shown graphs on normalized coordinates of the operating waveforms of recurring signals appearing at various nodes in the circuit. Common references in these wave forms to the collector voltage on electrode 21 show relative phases and timing of the associated signals. Current in the base electrode 19 is shown on the same time scale with collector voltage. (FIG. 2A). Also, collector current and collector voltage waveforms are shown in FIGS. 2B, and the emitter current is shown in FIG. 2C in relation to the collector voltage. The base voltage is shown in FIG. 2D in relation to the collector voltage. Thus, repeated oscillations of the circuit produce the voltage pulses across the collector-emitter output, as shown in each of FIGS. 2A–D, which can be conveniently rectified and voltage multiplied in known manner, as may be required to provide high voltages at low current requirements such as, for example, balancing voltage for air ionizing applications.

These waveforms illustrate currents flowing back and forth between the inductors 27, 29 through the collector-base junction of the transistor 9, and are not attributable to mutual coupling between the inductors. It should be noted from FIG. 2A that the voltage pulse on the collector 21 is initiated at a time when the base current drops to a negligibly low value (around zero) that is insufficient to sustain conduction of collector current through the transistor 9, and the transistor therefore turns off. The voltage pulse on the collector 21 results from fly back dissipation of stored energy in inductor 29, and the resulting collector current flowing through the forward-biased collector-base junction decays commencing as the transistor 9 turns off and the collector voltage pulse begins, is shown in FIG. 2B. As the transistor 9 turns off, the emitter current rapidly drops to zero, and again increases (similarly to collector current in FIG. 2B) as transistor 9 turns on again at a time about at the end of the pulse of collector voltage, as shown in FIG. 2C. The base voltage exhibits a negative transient in time synchrony with transients in base, emitter and collector currents, as shown in FIGS. 2A–C, as the transistor 9 turns on at about the end of the pulse of collector voltage, as shown in FIG. 2D. The base current declines slowly relative to the collector activity. This time constant is proportional to GL/R, where G is the transistor gain, L is the base inductor 22 and R is a low base resistance of transistor 9. If a large output is desired, this time constant should be longer than the collector pulse to insure ample energy is supplied to the collector inductor 29. The collector pulse width is proportional to ½ the inductor resonant frequency and thus is proportional to the square root of LC, which is naturally very short compared with GL/R.

The table of FIG. 4 illustrates wide variations of component values for reliable operation on input voltages of about 0.5 to about 24 volts for producing peak output voltages of almost 250 volts at operating frequencies in the range from about 45 KHz to about 1950 KHz. Voltage multiplication factors as high as about 25 from input voltage to output peak voltages (without collector loading) are achieved with the present invention using components of various parameter values, as shown in the table of FIG. 4.

Specifically, the table of FIG. 4 indicates the operating characteristics of the circuit of FIG. 3 for various values of the base resistor 23, 33, and inductor 27, and inductor 29 and input voltage (Vin) 15, with resultant cyclic repetition frequencies (R KHz) 35 and peak output voltages (Eo max) 17. One combination of components is identified as the basis for operation in the manner that produced the waveforms illustrated in FIGS. 2A–D.

The peak levels of output voltages (FIG. 2A) may be diminished by collector loading, for example, by conventional rectification circuitry in applications requiring conversion of the peak levels of output voltage to DC at a level that is a multiple of the input voltage level for use in low-current applications.

Figure 5:
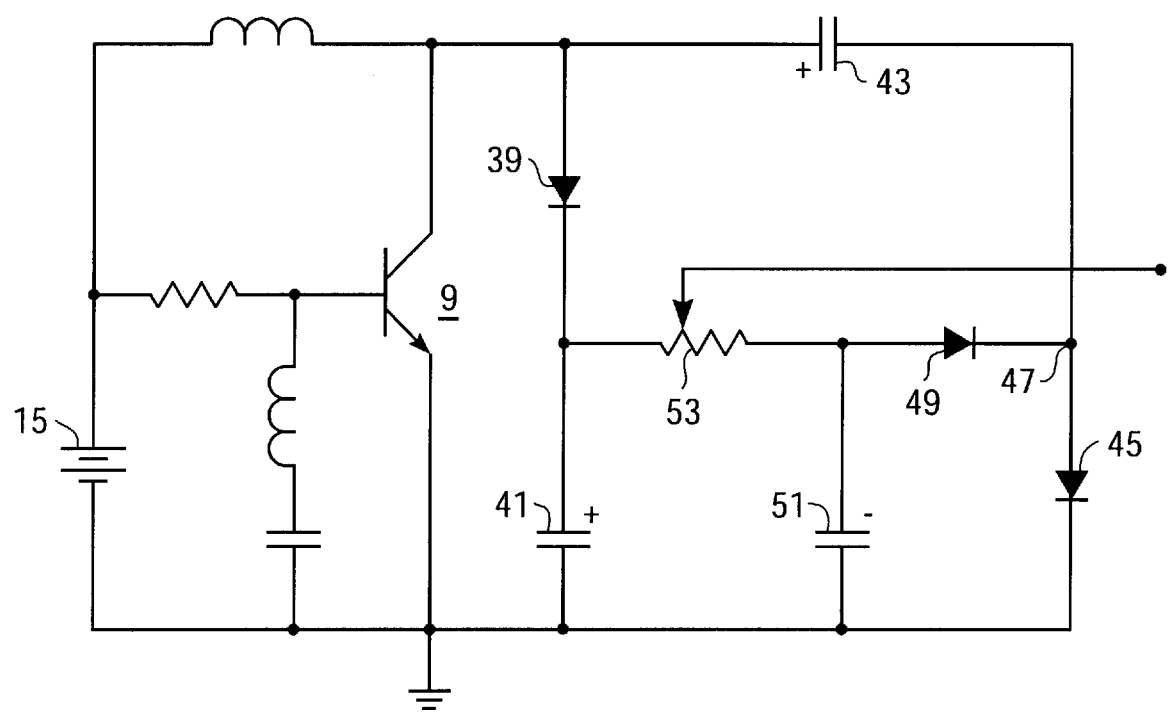
FIG. 5 is a schematic diagram of an output utilization circuit for operation with the oscillator of the present invention.

Referring now to the schematic diagram of FIG. 5, there is shown a rectifying circuit for operation with the oscillator circuit of the present invention that produces predominantly only one polarity of output pulses. Specifically, the rectifying circuit includes diode 39 and capacitor 41 serially connected to ground reference to receive the output pulses from the collector 21 for half-wave rectification of the pulses present on the collector 21 of the transistor 9. Charge thus conducted by diode 39 during pulses appearing on the collector 21 accumulates in capacitor 41 as a voltage of the polarity and of substantially the amplitude of the pulses appearing on the collector 21.

In addition, the series connection of capacitor 43 and diode 45 to ground to receive the pulses appearing on the collector 21 conducts charge that accumulates in capacitor 43 as a voltage of the polarity above ground and of substantially the amplitude of the pulses appearing on the collector 21 of the transistor 9. However, in the alternate cycle of operation during which the transistor 9 is conductive, the polarity of voltage on capacitor 43 is referenced substantially to ground and establishes node 47 at a voltage amplitude below ground reference (or negative) substantially equal to the voltage across capacitor 43. One output utilization circuit connected to the node 47 includes diode 49 and capacitor 51. Negative voltage on node 47 forward biases diode 49 to conduct charge from capacitor 51 which therefore accumulates a voltage thereacross of polarity below ground reference and of amplitude substantially equal to the charge division between the capacitances of capacitors 43 and 51. Therefore, both positive and negative voltages are provided across capacitors 41, 51 relative to ground reference from operation on positive pulses produced at the collector 21 of transister 9 operating in the manner, as previously described on positive input voltage 15 relative to the ground reference. Where desirable, a range of output voltages between the positive and negative voltages appearing across the capacitors 41, 51 may be selected by a variable voltage divider 53 connected across the capacitors 41, 51. A wide range of output voltages and polarities are thus converted from an applied input of selected voltage amplitude and polarity.

I claim:

1. A signal translating circuit comprising:
    a transistor having a base and a collector isolated of external circuit elements connected therebetween and having an emitter connected to a common terminal of an input and an output;
    a series circuit of a bypass capacitor and a first inductor connected between base and emitter of the transistor;
    a second inductor connected between another terminal of the input and the collector; and
    a resistor connected to said another terminal of the input for supplying bias current to the base for sustaining oscillatory operation to produce a signal at another terminal of the output connected to the collector.

2. The signal translating circuit as in claim 1 in which the inductance of the second inductor is greater than the inductance of the first inductor.

3. The signal translating circuit as in claim 1 in which the first and second inductors are mutually de-coupled.

4. The signal translating circuit as in claim 1 in which the resistor is connected to the base.

5. The signal translating circuit as in claim 1 in which the resistor is connected to the common connection of the capacitor and the first inductor for supplying the bias current therethrough to the base.

6. An oscillator circuit comprising:
    a switching element having an input circuit and an output circuit isolated of external circuit elements connected therebetween and being operable in a first mode for which the switching element is conductive in the output circuit and is not conductive between output and input circuits in response to signal supplied in the input circuit, and in a second mode for which the switching element is not conductive in the output circuit and is conductive between output and input circuits;

a first inductor and capacitor serially connected in the input circuit to receive energy supplied thereto during operation of the switching element in the second mode and for supplying energy to the input circuit of the switching element in the first mode; and a second inductor connected in the output circuit of the switching element for receiving energy during operation thereof in the first mode, and for supplying energy to the first inductor during operation of the switching element in the second mode.

7. The oscillator circuit as in claim 6 in which the second inductor exhibits greater inductance than the first inductor.

8. The oscillator circuit as in claim 6 in which the switching element operates in the first mode during an interval in which signal is received at the input circuit, and operates in the second mode substantially during intervals in which not operating in the first mode.

9. The oscillator circuit as in claim 6 in which the input and output circuits of the switching element include a common terminal, and the first inductor and capacitor are serially connected to the common terminal in the input circuit.

10. The oscillator circuit as in claim 6 in which the first and second inductors are mutually de-coupled.

11. The oscillator circuit as in claim 6 including bias signals supplied to the output circuit through the second inductor, and supplied to the input circuit through a resistor.

12. The oscillator circuit as in claim 7 in which the ratios of the inductances of the first and second inductors are selected to determine the rate of transfer between operations in the first and second modes.

13. The signal translating circuit according to claim 6 comprising:

a first diode and a first output capacitor serially connected to the output circuit of the switching element for conduction through the first diode of signal appearing at the output circuit during operation of the switching element in the second mode;

a second diode and a second output capacitor serially connected to the output circuit of the switching element for conduction through the second diode of signal appearing at the output circuit during operation of the switching element in the second mode; and a third diode and a third output capacitor serially connected across the second diode for conduction through the third diode between the second and third output capacitors during operation of the switching element in the first mode to provide output voltages across the first and third output capacitors of opposite polarities in response to signal appearing at the output circuit during operation of the switching element in the second mode.

14. The signal translating circuit according to claim 13 in which the first and third output capacitors are commonly connected to one node of the output circuit; and the first diode and second output capacitor are commonly connected to another node of the output circuit.

15. The signal translating circuit according to claim 14 including a structure connected between the first and third output capacitors for providing therefrom an output voltage of selected amplitude and polarity relative to the one node.

16. A circuit for operation on a recurring waveform including pulses of one polarity with respect to a reference level, the circuit comprising:

a first capacitor and a first diode serially connected to receive the recurring waveform for conduction through the first diode in response to pulses of said one polarity;

a second capacitor and a second diode serially connected to receive to recurring waveform for conduction through the second diode in response to pulses of said one poarity; and a utilization circuit connected to the second capacitor for deriving an output therefrom of polarity opposite to said one polarity.

17. The circuit according to claim 16 in which the utilization circuit includes a third capacitor and a third diode serially connected across the second diode for conduction through the third diode between the second and third capacitors during intervals of non-conduction through the second diode.

18. The circuit according to claim 17 in which the first capacitor is connected with the third capacitor and second diode to a common conductor at the reference level.

19. The circuit according to claim 17 in which the first and third capacitors and said second diode is connected to a conductor at the reference level and the first diode is connected to receive the recurring waveform for conduction therethrough to the first capacitor in response to the pulses of said one polarity;

the second capacitor is connected to the second diode and to receive recurring waveform; and the third diode is connected between the second diode and third capacitor.

20. A signal translating circuit comprising:

a transistor having a base and a collector and having an emitter connected to a common terminal of an input and an output;

a series circuit of a bypass capacitor and a first inductor connected between base and emitter of the transistor;

a second inductor connected between another terminal of the input and the collector;

the ratio of inductances of the first and second inductors being selected to determine the frequency of oscillatory operation of the transistor in conductive and non-conductive states in response to signal applied to the common terminal and said another terminal of the input; and a resistor connected to said another terminal of the input for supplying bias current to the base for sustaining oscillatory operation to produce a signal at another terminal of the output connected to the collector.

* * * * *

UNITED STATES PATENT AND TRADEMARK OFFICE
CERTIFICATE OF CORRECTION

PATENT NO. : 6,515,458 B1
DATED : February 4, 2003
INVENTOR(S) : Leslie Partridge It is certified that error appears in the above-identified patent and that said Letters Patent is hereby corrected as shown below:

Column 6,
Line 14, delete "receive to" and insert -- receive the --
Line 16, delete "poarity" and insert -- polarity --
Line 30, delete "is" and insert -- are --.

Signed and Sealed this

Twenty-fifth Day of March, 2003

JAMES E. ROGAN
*Director of the United States Patent and Trademark Office*